Figure 1:
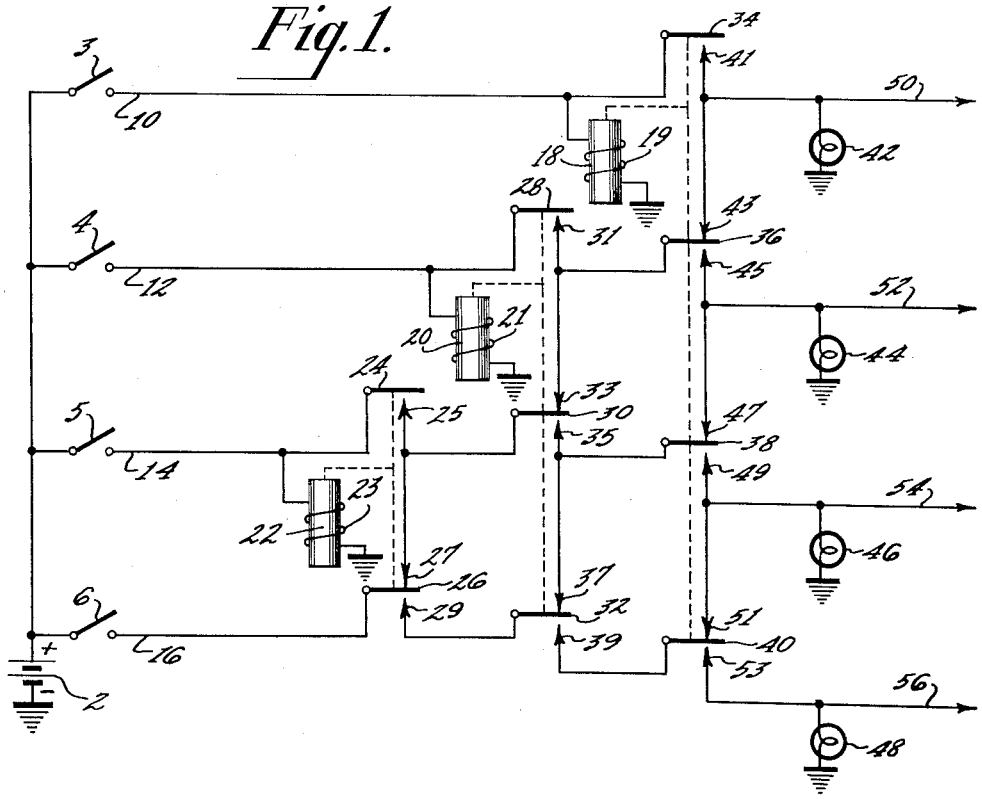

May 8, 1956  S. B. ADLER  2,745,023
REMOTE INDICATING AND CONTROL SYSTEM
Filed Feb. 18, 1953

INVENTOR.
Simpson B. Adler
BY Morris J. Rabin
ATTORNEY

United States Patent Office 2,745,023
Patented May 8, 1956

2,745,023

REMOTE INDICATING AND CONTROL SYSTEM

Simpson B. Adler, Haddonfield, N. J., assignor, by mesne assignments, to the United States of America as represented by the Secretary of the Army Application February 18, 1953, Serial No. 337,548

7 Claims. (Cl. 307—112)

This invention relates to remote control and/or indicating systems and, more particularly, although not necessarily exclusively, to a novel system for energizing one or more electrical circuits in a given group of circuits in response to the condition of one or more electrical circuits in another group of circuits and, also, for providing a continuous indication of the number of circuits that are energized.

It is desirable, in certain applications, to provide means for selectively transferring an electric signal from a single circuit or line or a group of circuits or lines to an associated circuit or line or group of circuits or lines for control purposes or the like. The signal transfer may effect remote control of other single or multiple circuits. The present invention provides novel and simple arrangements for obtaining signal transfer or passage in the manner just set forth, accompanied, if desired, by visual or audible indications of circuit conditions.

Remote type control and indicating systems, known heretofore, require that a certain predetermined set of conditions be coded or switched in some definite combination into the input circuit or circuits of the particular system in order that the proper response may be produced therefrom. Separate voltage means are often required in known systems for the operation of relays associated with the above mentioned systems. Certain input circuit sequences of operation are essential to the proper operation of some of the known remote control and indication systems. In accordance with the present invention, the need for coding or for definite input combinations is eliminated. Also, it is unnecessary to employ separate voltage means for operation of relays or to follow any special input sequence in systems embodying this invention.

It is an object of the present invention to provide a remote control and indicating system in which the output circuits will operate independently of the sequence in which the input circuits are energized.

It is another object of the invention to provide a system of the type described in which predetermined programming or coding of the input circuits is not required.

It is a further object of the invention to provide a system for indication and/or control in which the output circuits of the system function to indicate or to control, depending only upon the number of input circuits which have been energized.

By way of example, a remote indicating and control system in accordance with the present invention may comprise a number of circuits $a_1, a_2, a_3, \ldots a_n$ where $n$ is the number of circuits. Each circuit from $a_1$ to $a_{n-1}$ has associated therewith, a corresponding relay $K_1$ to $K_{n-1}$. A plurality of output circuits $b_1 \ldots b_n$ are also operatively associated with the relays in such a manner that the outputs will be energized consecutively, depending upon the number of input circuits that are energized. A series of indicating elements may be associated with each output circuit so that an indication of the controlled operation may be had at any instant during the operation of any or all of the output circuits.

Figure 2:
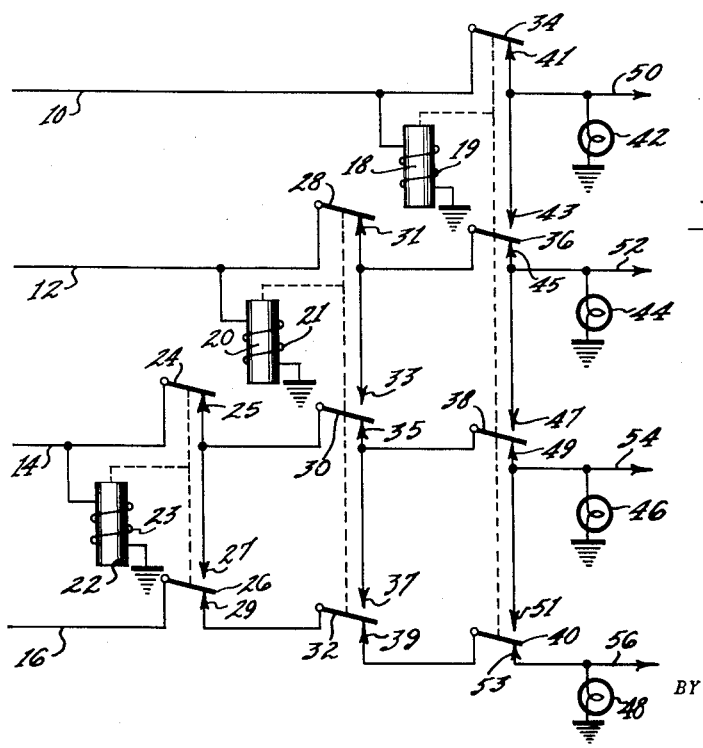

The novel features that are considered characteristic of the invention are set forth with particularity in the appended claims. The invention itself, however, both as to its organization and method of operation, as well as additional objects and advantages thereof will be best understood from the following description when read in connection with the accompanying drawing, in which:

Figure 1 is a schematic circuit diagram of a remote control and indicating circuit arranged in accordance with this invention; and Figure 2 is a showing of the apparatus of Figure 1 with all of the input circuits energized.

Referring to the drawing, and in particular to Figure 1, four input circuits 10, 12, 14 and 16 are shown in schematic form. Each input circuit is represented by a single wire with a common or "ground" return. It will be understood that the input circuits may be energized from a suitable voltage source or sources through suitable switches. One switch will or may be provided for each circuit. As any desired system of switches or switching devices may be employed, they are indicated only schematically and illustratively on the drawing. A voltage source 2 and switches 3 to 6 are shown. The input circuits 10, 12 and 14 are connected to the windings 19, 21 and 23, respectively, of relays 18, 20 and 22, respectively. The relays in Figure 1 are shown in the deenergized condition. Movable relay contact tongues or armatures 34, 36, 38 and 40 are mechanically coupled or linked so as to be operatively associated with the winding 19 of relay 18. Energization of the input circuit 10, which is connected to the relay 18, causes each of the armatures 34, 36, 38 and 40 to be actuated simultaneously and effectively in the same direction with respect to the stationary front contacts 41, 45, 49 and 53 and the stationary back contacts 43, 47 and 51. An output circuit, shown schematically as a single wire 50, is connected to the relay contacts 41 and 43. A single lamp 42, or other visual or audible signal, is connected to the wire 50 and to ground. The wire 50 may be connected to any desired signal or voltage receiving apparatus. In a similar manner, the other output circuits, represented by wires 52, 54 and 56 are connected to contacts 45 and 47, 49 and 51 and the contact 53, respectively. Lamps 44, 46 and 48 are connected to the wires 52, 54 and 56, respectively, and to ground in the illustrative example. Relay 20, which is similar to the relay 18, is coupled or mechanically linked to the relay contact tongues or armatures 28, 30 and 32 which cooperate with the front contacts 31, 35 and 39 and the back contacts 33 and 37. Relay 22 has its contact tongues or armatures 24 and 26 mechanically linked so that both armatures may be simultaneously operated in the same direction with respect to the front contacts 25 and 29 and the back contact 27. The input circuit represented schematically by the wire 16 is connected to the armature 26 of the relay 22.

There will now be described the condition where the output circuit 50 is energized while any one of the input circuits 10, 12, 14 or 16 is energized. If a voltage is applied between input circuit 10 and ground the winding 19 of the relay 18 will be energized. This in turn causes relay armatures 34, 36, 38 and 40 associated with the winding 19 to be operated or pulled in and to make electric contact with the armature contacts 41, 45, 49 and 53, respectively. Thus it can be seen, that a complete circuit now exists between the input 10 through the armature 34, the armature contact 41 to the output circuit 50. The applied voltage, therefore, is caused to appear at the output circuit 50. Since the circuit from the input 10 to the output 50 is complete the indicating lamp 42 will light. The applied voltage may be utilized by means of the output circuit 50, to control any desired operation, such for example, as actuating timing devices, vacuum tubes or other electrically or electronically operated circuitry, not shown.

As voltage is applied to the input circuit 12 through the winding 21 of relay 20 the winding 21 will be energized. The relay armatures 28, 30 and 32 associated with the relay 20 will be caused to make contact with the armature contacts 31, 35 and 39 linked to relay 20, respectively. Thus the circuit from the input 12 through the armature 28 and armature contact 31 is completed and the applied voltage appears at the armature contact 43. If it be assumed further, that the input circuit 10 is not energized, then the relay armature 36 makes contact with the armature contact 43 and thus the circuit from the input 12 is completed to the output 50, and the applied voltage is thus made to appear at the output 50 and may be used as before mentioned, to actuate or control equipment associated therewith.

Assuming that voltage is applied between the input circuit 14 and ground, the winding 23, of the relay 22, will become energized. The relay armatures 24 and 26 will make contact with the armature contacts 25 and 29, respectively. If the input circuits 10 and 12 are not energized, the relay contacts 43 and 33 will contact armatures 36 and 30, respectively, and the circuit from the input 14 will be completed to the output 50 and the applied voltage can thus be made to appear at the output 50 as before.

Similarly, assuming that the input circuits 10, 12 and 14 are not energized, and that a voltage is applied between the input circuit 16 and ground, a circuit may then be completed through the armature 26, the armature contact 27 through the armature 30 and the associated armature contact 33 to the armature 36 and the armature contact 43 which is serially connected to the output 50. Again the applied input voltage will appear at the output 50.

It should thus be obvious from the above description that the circuit operation, as above described, may be carried on for as many circuits as may be desired. It should be noted that when any one input circuit is energized, the output circuit 50 becomes energized.

There will not be described the condition where the outputs 50, 52, 54, and 56 are energized. When a voltage is applied between input circuit 12 and ground, it has been pointed out before that the applied voltage may be caused to appear at the armature contact 43. While input circuit 10 is energized, relay armature 36 makes contact with the armature contact 45. Thus the circuit from input circuit 12 is completed through the relay armature 28, the armature contact 31, the armature 36 and the armature contact 45 to the output circuit 52. Thus the voltage applied at the input circuit 12 appears at the output circuit 52 and may be used to control any of the aforementioned operations.

It can be seen from the foregoing description that the input voltages applied to the input circuits 10 and 12 can be made to appear at the output circuits 50 and 52, respectively.

Referring now to the circuit diagram of Figure 2, it can be seen that while any one of the relays 18, 20 or 22 is energized, the armatures 34, 28 or 24, respectively, are caused to make contact with armature contacts 41, 31 or 25, respectively. If any one of the relays 18, 20 or 22 are not energized then the associated armatures 34, 28 or 24 will be held in the open position. For example, when the winding 19 of the relay 18 is energized the four armatures 34, 36, 38 and 40 make contact with the four armature contacts 41, 45, 49 and 53, respectively, associated therewith. When relay 18 is not energized, the armature 34 is in the open position while the armatures 36, 38 and 40 make contact with the armature contacts 43, 47, and 51, respectively. It will thus be apparent to those skilled in the art, that any two input circuits that are caused to be energized will in turn cause output circuits 50 and 52 to also be energized.

Similarly, it may be shown that any three energized input circuits will cause output circuits 50, 52 and 54 to become energized. When each of the relays 18, 20 and 22 are energized and input circuit 16 is also energized, each of the outputs 50, 52, 54 and 56 will be energized. If any relay is de-energized all succeeding inputs are switched one, to the appropriate outputs. For example, let it be assumed that the input circuits 10, 12, 14 and 16 are energized. Then, each of the three relays 18, 20 and 22 will be energized, and each of the four output circuits 50, 52, 54 and 56 will be energized by means of their associated circuits. Now, assume that input circuit 10 is de-energized relay 18 will be de-energized. Relay 18 will thus cause input circuit 12 to be switched to output circuit 50, input circuit 14 will be switched to output circuit 52 and input circuit 16 will be switched to output circuit 54. Output circuit 56 is thus de-energized. If input circuits 10, 14 and 16 are energized, then relay 18 would cause output circuit 50 to be energized and relay 20 would switch input circuit 14 to output circuit 52 and input circuit 16 to output circuit 54. Output circuit 56 is thus de-energized.

There has thus been described a novel relay actuated remote indicating and control system in which an indication or control of any number of energized circuits is provided for. Obviously, the circuits above described may be extended for as many input or output circuits as may be desired. And in any case, a given number of energized input circuits will cause the first output circuit to become energized.

What is claimed is:

1. A remote indicating and control system comprising, a number of input circuits, a relay associated with each of said circuits, operating means for each of said relays, output circuits connected to said relays, means to selectively energize each of said relay operating means, and a series of means to energize a number of said output circuits consecutively depending upon the number of input circuits that are energized.

2. A remote indicating and control system comprising, a number of input circuits, relay means associated with each of said input circuits, output circuits connected to said relays, means to energize said input circuits in a random order, and a series of means to energize said output circuits consecutively in a predetermined order, the number of said output circuits energized corresponding to the number of input circuits energized.

3. A remote indicating and control system comprising a plurality of input circuits, a plurality of relays, means to connect said input circuits to said relays, output circuits for indicating and controlling equipment, means to apply energy to said relays to control said output circuit in response thereto and a series of means to consecutively actuate said output circuits in a predetermined manner, the number of said output circuits energized corresponding to the number of said input circuits energized.

4. A remote indicating and control system comprising a plurality of input circuits, a plurality of relays, means to connect said input circuits to said relays, output circuits for indicating and controlling equipment in response to a random order of input energy, means to apply energy to said relays so as to cause said relays to control said output circuit in response to said energy applying means, and a series of means to control said output circuits consecutively in a predetermined order depending solely upon the number of input circuits that are energized.

5. A remote indicating and control system comprising a plurality of relays, each of said relays having contacts and operating means associated therewith, means to connect said input circuits individually to said operating means of each of said relays, output circuits for indicating and controlling equipment, means to control said output circuits by applying energy consecutively to said output circuits depending upon the number of input circuits that are energized, and said last-named means including said contacts of said relays.

6. A switching system comprising a series of relays having windings and contacts, a series of input circuits connected across said windings, one or more said input circuits adapted to be energized in a random order at the same time, a series of output circuits connected to said contacts, and means for actuating said contacts in a predetermined order to energize consecutively a number of said output circuits, said number being the same as said input circuits energized.

7. A switching system in accordance with claim 6, wherein the number of said series of input circuits is one more than the number of said series of relays.

References Cited in the file of this patent

Relay "Trees" and Symmetric Circuits, S. N. Washburn, Bell Tel. Laboratories, published by A. I. E. E., May 1949.